United States Patent [19]
Benson
[11] 3,818,446
[45] June 18, 1974

[54] MAGNETIC INK CHARACTER TRANSITION READER

[75] Inventor: David A. Benson, Eden Prairie, Minn.

[73] Assignee: Cavcom, Inc., Minneapolis, Minn.
[22] Filed: Feb. 20, 1973
[21] Appl. No.: 333,809

[52] U.S. Cl. .................... 340/146.3 C, 235/61.11 D
[51] Int. Cl. .............................................. G06k 9/13
[58] Field of Search ............ 340/146.3 ED, 146.3 C, 340/146.1; 235/61.11 D

[56] References Cited
UNITED STATES PATENTS
3,571,793 3/1971 Britt ............................ 340/146.3 C Primary Examiner—Thomas A. Robinson

[57] ABSTRACT
Magnetically saturated, magnetic ink characters on a check blank are passed by a mechanical check handler under a magnetic read head. A positive signal is generated in the head each time it moves into a segment of more ink, and a negative signal is generated each time the head moves into a segment of less ink. The magnitude of these signals depends upon the magnitude of the difference in the amount of ink detected by the magnetic read head as it makes the transition from one segment of each character to the next. The coding of the magnetic characters is such that a plurality of adjacent segments vary abruptly in magnitude. However, the magnitude of the change between some adjacent segments and consequently the magnitude of the transition signals, will be substantially smaller than the magnitude between other adjacent signals. These smaller, weaker signals can sometimes be lost. Each character in which such smaller signals and hence the possibility of errors can occur is identified by a plurality of composite binary codes, each one representing one of the possible signal combinations resulting from the loss or capture of every possible combination of weak signals. In some cases the same composite binary code represents more than one character. In these cases, direction (positive or negative) of the signals generated by the read head is used to differentiate between such signals to unambiguously identify the particular character.

3 Claims, 6 Drawing Figures

FIG. 4

| CHARACTER | | BIT 87 654 321 | OCTAL DESIGNATIONS OF BINARY CODES |
|---|---|---|---|
| 0 | + | 10 000 010 | |
| | - | 01 000 001 | |
| | anded | 11 000 011 | 3 0 3 |
| 1 | + | 10 100 000 | |
| | - | 00 0X1 000 | |
| | anded | 10 1X1 000 | 2 7 0   2 5 0 |
| 2 | + | 10 0X0 000 | |
| | - | 0X 001 000 | |
| | anded | 1X 0X1 000 | 3 3 0   2 3 0   3 1 0   2 1 0 |
| 3 | + | 11 000 000 | |
| | - | 00 100 X00 | |
| | anded | 11 100 X00 | 3 4 4   3 4 0 |
| 4 | + | 10 001 000 | |
| | - | 00 X00 010 | |
| | anded | 10 X01 010 | 2 5 2   2 1 2 |
| 5 | + | 10 00X 000 | |
| | - | 0X 000 100 | |
| | anded | 1X 00X 100 | 3 1 4   2 1 4   3 0 4   2 0 4 |
| 6 | + | 10 X00 100 | |
| | - | 0X 0X0 010 | |
| | anded | 1X XX0 110 | 3 6 6   3 4 6   2 6 6   2 4 6   3 2 6   3 0 6<br>2 2 6   2 0 6 |
| 7 | + | 10 X0X 000 | |
| | - | 0X 010 X00 | |
| | anded | 1X X1X X00 | 3 7 4   3 7 0   2 7 4   2 7 0   3 6 4   3 6 0<br>2 6 4   2 6 0   3 3 4   3 3 0   2 3 4   2 3 0<br>3 2 4   3 2 0   2 2 4   2 2 0 |
| 8 | + | 11 000 100 | |
| | - | 00 100 011 | |
| | anded | 11 100 111 | 3 4 7 |
| 9 | + | 10 000 X00 | |
| | - | 0X 100 010 | |
| | anded | 1X 100 X10 | 3 4 6   2 4 6   3 4 2   2 4 2 |

MAGNETIC INK CHARACTER TRANSITION READER

BACKGROUND OF THE INVENTION

An elaborate system has been employed for some time past for integrating the area of magnetic ink present in each of seven zones or segments of a stylized (E13B) character as the magnetically saturated character is passed under a magnetic (read) head. A signal proportional to the area of magnetic encoding in each of eight different segments of the characters is used to positively identify each different character. The equipment including the electronics and magnetic and mechanical components thereof is extremely intricate, delicate, and, hence, extremely expensive.

Customarily the expense of such equipment has been so great that only banks of very substantial size can afford such equipment, smaller banks having to rely on clearing houses or larger affiliated banks to perform the decoding services for them. Also, the cost of such decoding equipment has effectively prevented development of other uses for magnetically encoded characters.

BRIEF SUMMARY OF THE INVENTION

Characters of magnetic ink presently in use are so designed that there are a finite number of distinctive segments which can pass by a magnetic read head during the same finite number of time intervals. Present practice calls for seven such segments and time periods. After each of the characters is encoded in magnetic ink on a slip of paper such as a check, for example, it is saturated in one direction magnetically by a first magnetic (record) head. It then passes by a second magnetic (read) head and a change in magnetic flux occurs at each of the eight points in time that the character passes over the head in transition into a first segment, between adjacent segments and out of the last of the seven segments. When the transition is from no ink or lesser ink to more ink, the read head output will be in a positive direction. Where the transition is from more ink to less ink or to no ink, the read head output is in a negative direction. All transitions occur at a segment edge or division, so each character can be divided into an eight-bit binary code derived from the presence (Binary 1) and absence (Binary 0) of magnetic transition signals at each segment division. The signal level at the read head is directly proportional to the amount of change between an ink-and-less-ink transition. Where the transition is the full height of the character, a much greater signal will occur than if the transition is for a small portion of the character height. Because of this, some transition signals are so small that they are sometimes lost to the electronic system. By identifying those transitions where smaller signals occur, it is predicted which binary bits of a given character can occasionally be lost. By assuming each possible combination of such losses, every possible binary code for each character can be determined.

In the case of the characters used at the present time, and using a composite binary code, there are three instances where the same binary code identifies two different characters. This conflict is resolved by referring to the polarity of the bits of the binary codes. Once the polarity is considered, the conflict is resolved and a unique combination is established which unambiguously identifies each character.

In order to reliably generate such binary codes for each character, it is necessary that the slip of paper carrying the magnetic ink encoding is moved past the record and read heads at a uniform rate. This is accomplished by providing a cylindrical paper transport drum rotating at a constant speed, and a capture belt in adjacent contacting relationship to the outer surface of this drum. The slip of paper, or check, to be read is passed to position between the endless capture belt and the transport drum; and the capture belt and drum are rotated to capture or entrap the magnetically encoded slip of paper between them, causing it to rotate with the drum and to be discharged from between the capture belt and the drum after it has passed under the magnetic record and read heads and a read head signal trace has been obtained.

IN THE DRAWINGS

FIG. 4 is a chart showing all possible positive, negative and composite bit codes for ten of the presently, commonly used magnetic characters, and listing all possible octal designations for each of such composite codes;

DESCRIPTION OF PREFERRED EMBODIMENT

Figure 1:
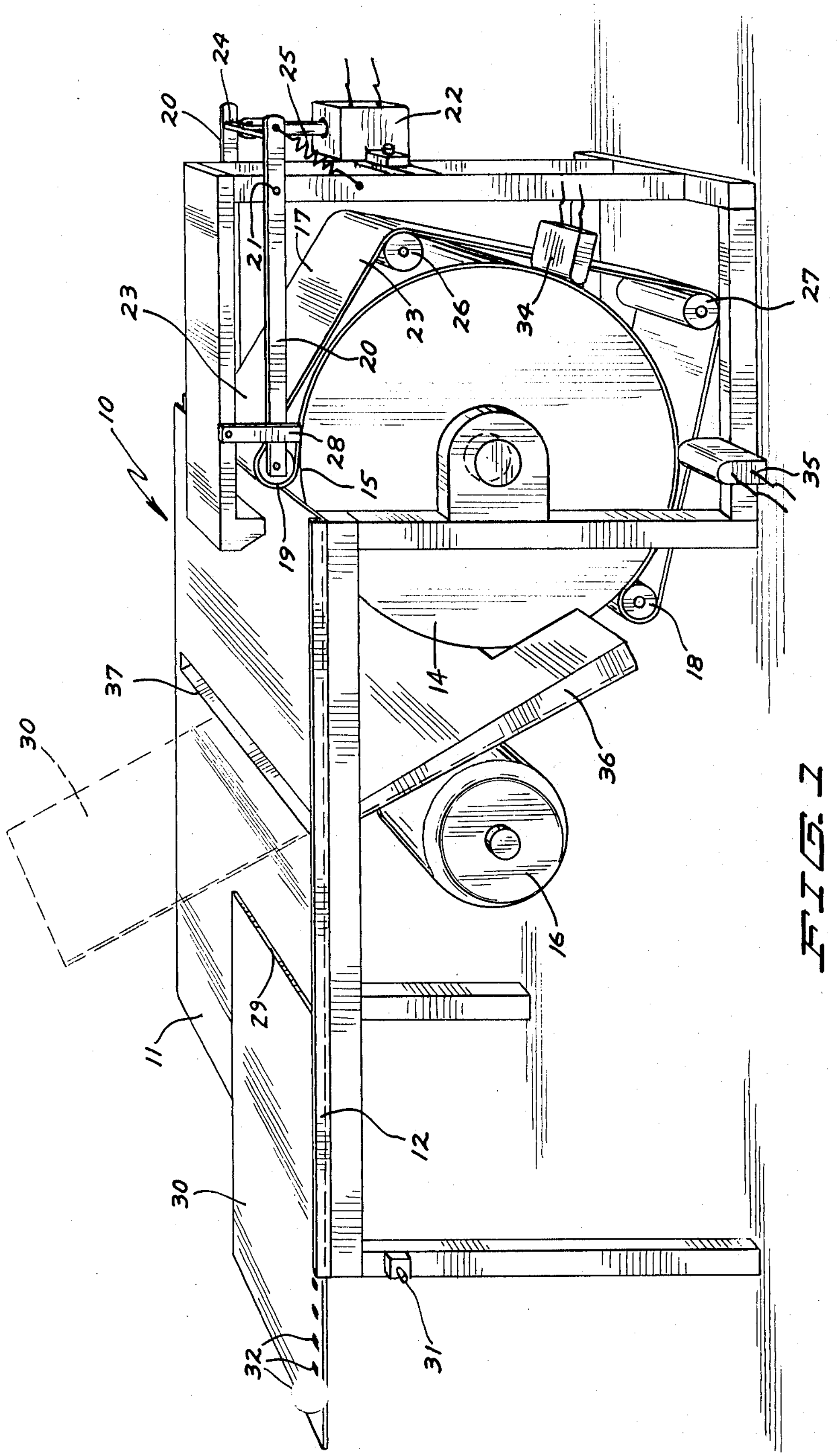
FIG. 1 is a schematic perspective view of the paper handler of the present invention.

A main frame 10 supports a paper tray 11 along the near edge of which, as seen in FIG. 1, is an integral upstanding paper guide 12. Rotatably supported in the main frame in any usual or preferred manner is a cylindrical paper transport drum 14 which has an exterior cylindrical surface 15 of material which will have a relatively high coefficient of friction when in contact with paper. The drum 14 is driven by a flat belt 13 running on a flat motor pulley 33, driven by drum motor 16, whenever that motor is activated.

An endless capture belt 17 has an outer surface 23 of rubber or other material having a high coefficient of friction with respect to the outer cylindrical surface 15 of the drum and with respect to paper. The belt is supported to have a substantial portion thereof in intimate driven contact with the outer surface of the drum. This support is provided by a lower roller 18 mounted on the main frame 10 in any usual or preferred manner and situated to hold the belt 17 in contiguous contacting relationship with the drum; and an upper roller 19 rotatably mounted between pivot arms 20, 20 which in turn are pivoted to the main frame 10 as at 21. A capture solenoid 22 is situated on frame 10 to force outer ends 24, 24 of the pivot arms 20, 20 in upward direction thus to force upper roller 19, and consequently capture belt 17, down into contacting relation with the outer cylindrical surface 15 of the paper drum 14, or with a slip of paper between the belt and the drum. A spring 25 normally urges arms 20, 20 to tend to hold upper roller 19 in spaced relationship with respect to the drum 14.

Idler rollers 26 and 27 support that portion of the belt 17 returning to the top roller after having left the bottom roller in contiguous relation to the drum. Proper tensioning on the belt 17 can be achieved by spring loading one or both of the idler rollers, or in any other convenient or preferred manner.

A paper stop 28 is situated to encounter a leading edge 29 of a check 30 or other slip of encoded paper as it is slid along the paper tray 11 in touch with the paper guide 12. As shown, switch 31 is then manually actuated to energize a circuit to drive the drum motor 16. As soon as the drum motor attains its uniform speed and is, thus, driving the transport drum 14 at a uniform speed, suitable controls 41 activate the capture solenoid 22 to force the upper roller 19 and the adjacent portion of the capture belt down toward the outer cylindrical surface 15 of drum 14, thus trapping the leading edge 29 of the check 30 between the belt and the drum and causing magnetic characters 32 on the check to be carried past first magnetic record head 34 and second magnetic read head 35. These heads are also supported on the main frame 10 in any usual or preferred manner (not shown).

A paper return chute 36 is situated to have a plane paper return passageway 37 in tangential alignment with the cylindrical drum surface 15 at the point where the check 30 emerges from between that surface and the outer surface 23 of belt 17. The positioning of a check 30 after it has been discharged from the paper drum and as it leaves the paper return chute is as indicated in dotted lines in FIG. 1.

Figure 2:
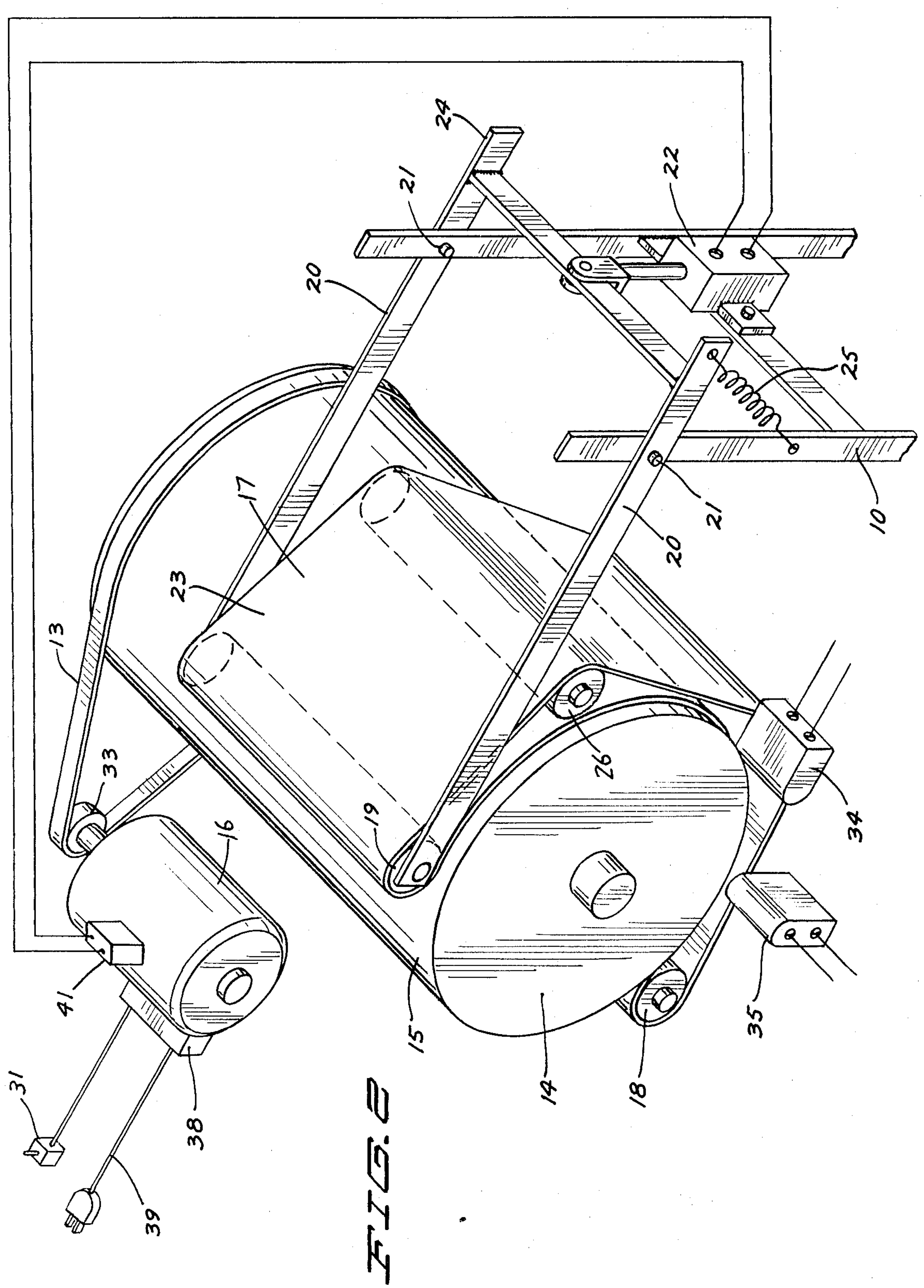
FIG. 2 is a schematic representation of the mechanical, magnetic and electrical circuit elements for the mechanical paper handler of the present invention.

Referring now to the schematic representation of the structure and circuitry of the mechanical paper handler as seen in FIG. 2, the starter switch 31 activates a motor control unit 38 which can contain an interlock circuit to continue to connect main power leads 39, 39 to the motor 16 until such time as the motor drives the transport drums through a complete cycle of operation. A timer (not shown) then disables the motor drive circuit. In the form of the invention shown, a period of one second has been found to be satisfactory for the driving of the paper handler through a complete cycle.

While a manually operated starter switch 31 is shown, and while a timer (not shown) is used to control the transport drum rotation, it is to be understood that a position switch sensitive to the arrival of the check 30 between the capture belt 17 and the cylindrical surface 15 of the transport drum 14 could be used to initiate operation of the drum motor; while a further position switch operative upon arrival of the check 30 at the position as seen in dotted lines in FIG. 1 could be utilized to disable the drum motor circuit. Many other variations of control devices and circuits could serve satisfactorily.

Figure 3:
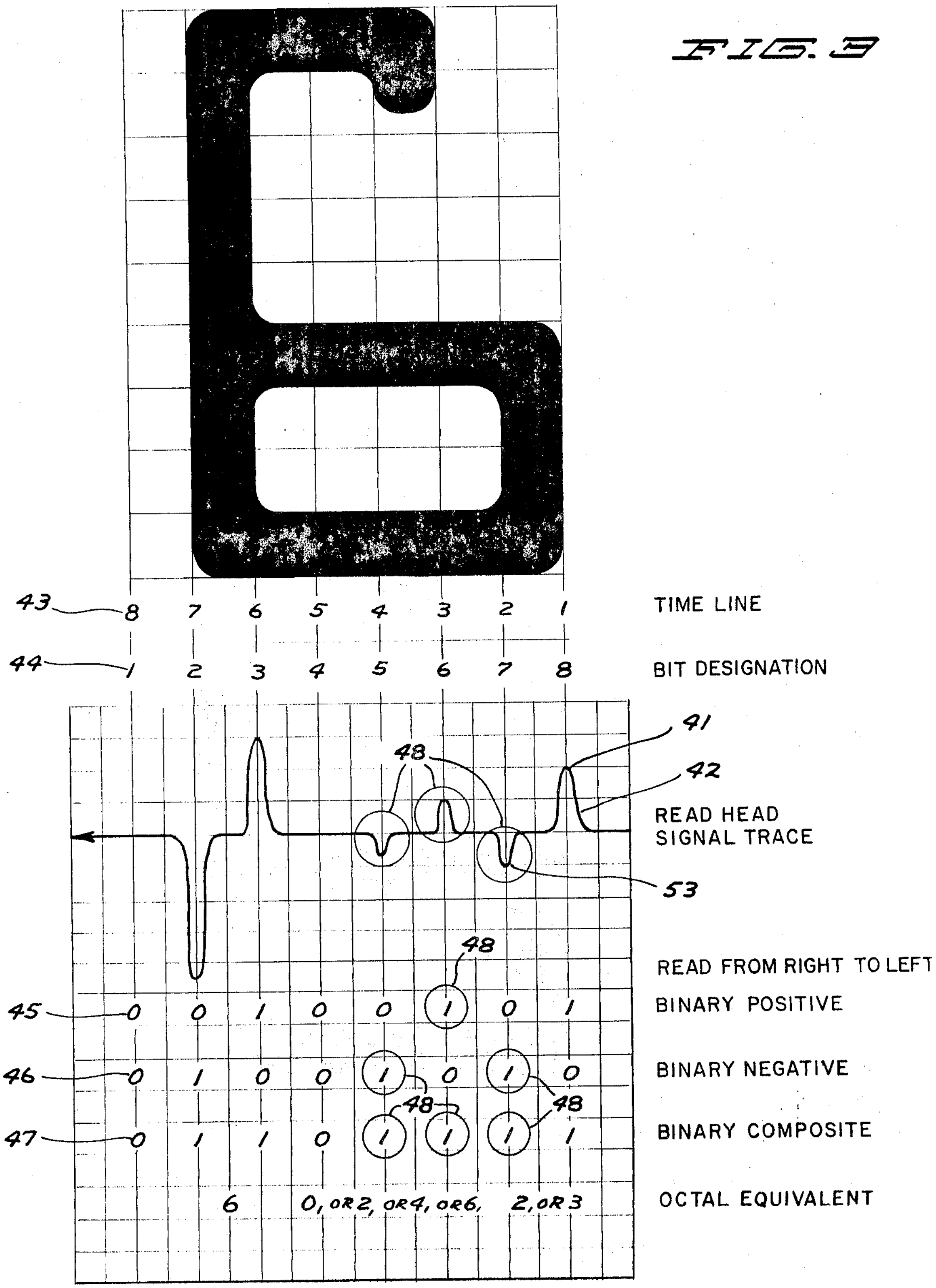
FIG. 3 is a graphical representation of a character "6" as it appears in magnetic ink, with a read head signal trace, the binary positive code, binary negative code, binary composite code, and the octal equivalent of the composite code indicated along a time line for each of the eight transition points as a read head passes across the seven segments of the magnetically saturated character.

Referring now to the enlarged representation of the magnetic coding of the numeral "6" as seen in FIG. 3, a grid, seven sections wide and nine sections high is illustrated with the magnetic encoding for the numeral "6" thereon. Since, as seen in FIG. 1, the read head moves relatively past each of the magnetically encoded characters from right to left as seen in FIG. 3, the signal generated by that read head is illustrated below the numeral "6" with a time line 43 running from right to left. The time segments involved are likewise numbered from right to left on the time line.

The signal generated in read head 35 will be proportional to the change in the totality of magnetic flux "seen" by the read head as it moves across a segment line from one segment to the next. Moving from an area of no ink or some ink to an area of more ink will cause a positive signal to be generated, while moving from an area of more ink to an area of lesser ink or of no ink, will cause a negative signal to be generated. Thus, reading from right to left, the movement of the encoded numeral 6 across time line 1 will cause a positive deflection proportional to approximately four vertical grid sections of magnetic encoding, and this signal is represented at 41 on the "read head signal trace" 42 of FIG. 2.

In moving across time line 2, the read head will "lose" two vertical grid sections of magnetic encoding, and so a negative signal having approximately half the magnitude of the first signal will be generated, as shown at 53 on trace 42.

Upon crossing time line 3, a positive signal of magnitude proportional to almost two grid sections is generated.

Upon crossing time line 4, slightly less than one vertical grid section will be lost, so a relatively small negative signal will be generated, as shown.

Since there is no change as the read head crosses time line 5, no signal is generated.

Six additional vertical grid sections are encountered as the read head 35 crosses time line 6, so a strong positive signal is encountered as is shown.

When the read head crosses time line 7, the change is from nine vertical grids of magnetic encoding to no magnetic coding at all, so a very strong negative signal is generated.

This readout phenomenon is plotted on read head signal trace 42 from right to left as seen in FIG. 2, the vertical scale being proportional to the number of vertical grid sections encountered by the read head. As will be noted in the plot of the read head signal trace 42, the signals generated by the head at time lines 2, 3 and 4 are not more than half the magnitude of the signal generated at time line 1, for example. These signals are so small that they can sometimes be lost if conditions for reading are poor. This can happen because of "noise" in the circuit, because of disruptive discharges of unrelated equipment, and for other reasons.

In accordance the present invention, this read head signal is converted into a positive eight-bit binary code derived from the presence (Binary 1) or absence (Binary 0) of positive magnetic transitions at each segment division and into a similarly generated negative binary code. In FIG. 3, the bit designations are laid out along line 44, while the positive binary code is designated along line 45, the negative binary code along line 46, and the binary code representing the composite of the positive code and the negative code is indicated along line 47. Each of these codes is to be read from the right to the left in FIG. 3.

Figure 5:
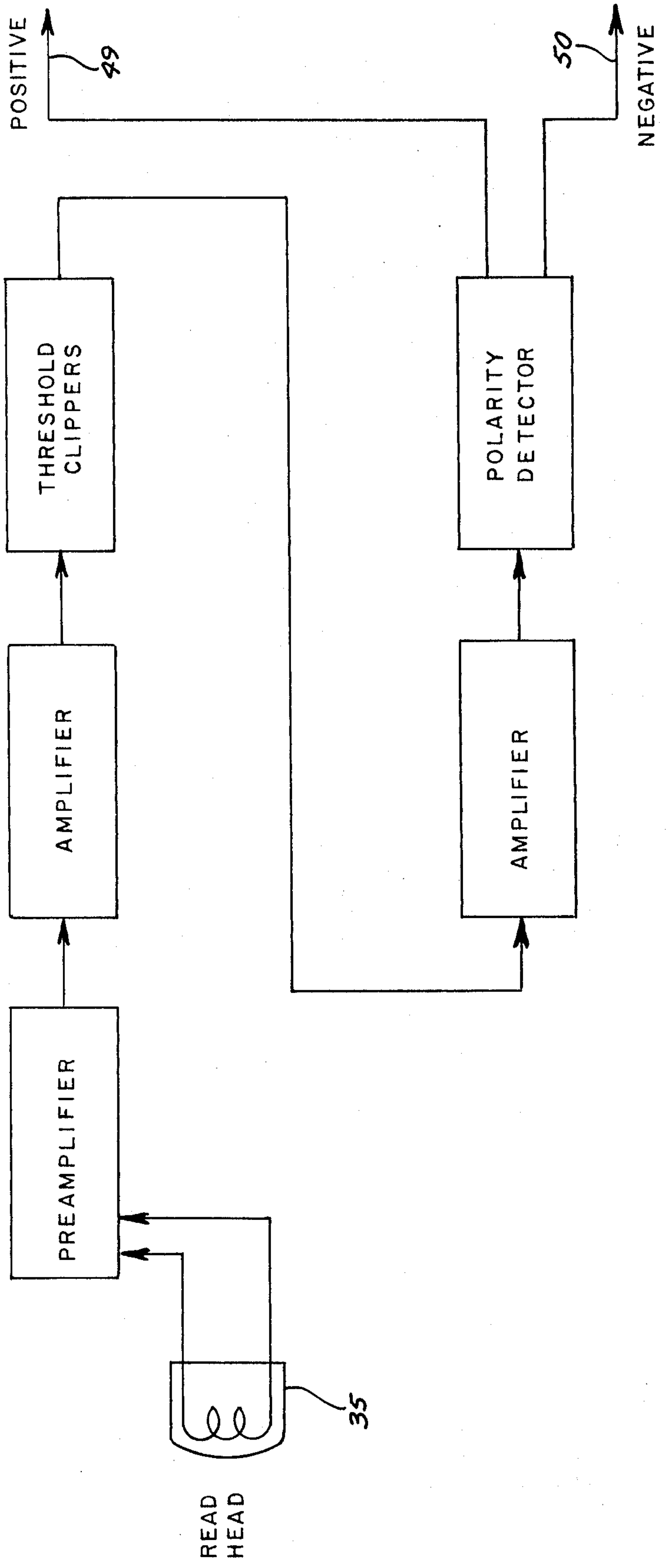
FIG. 5 is a block diagram of a preferred form of the read head signal trace generator of the present invention.
Figure 6:
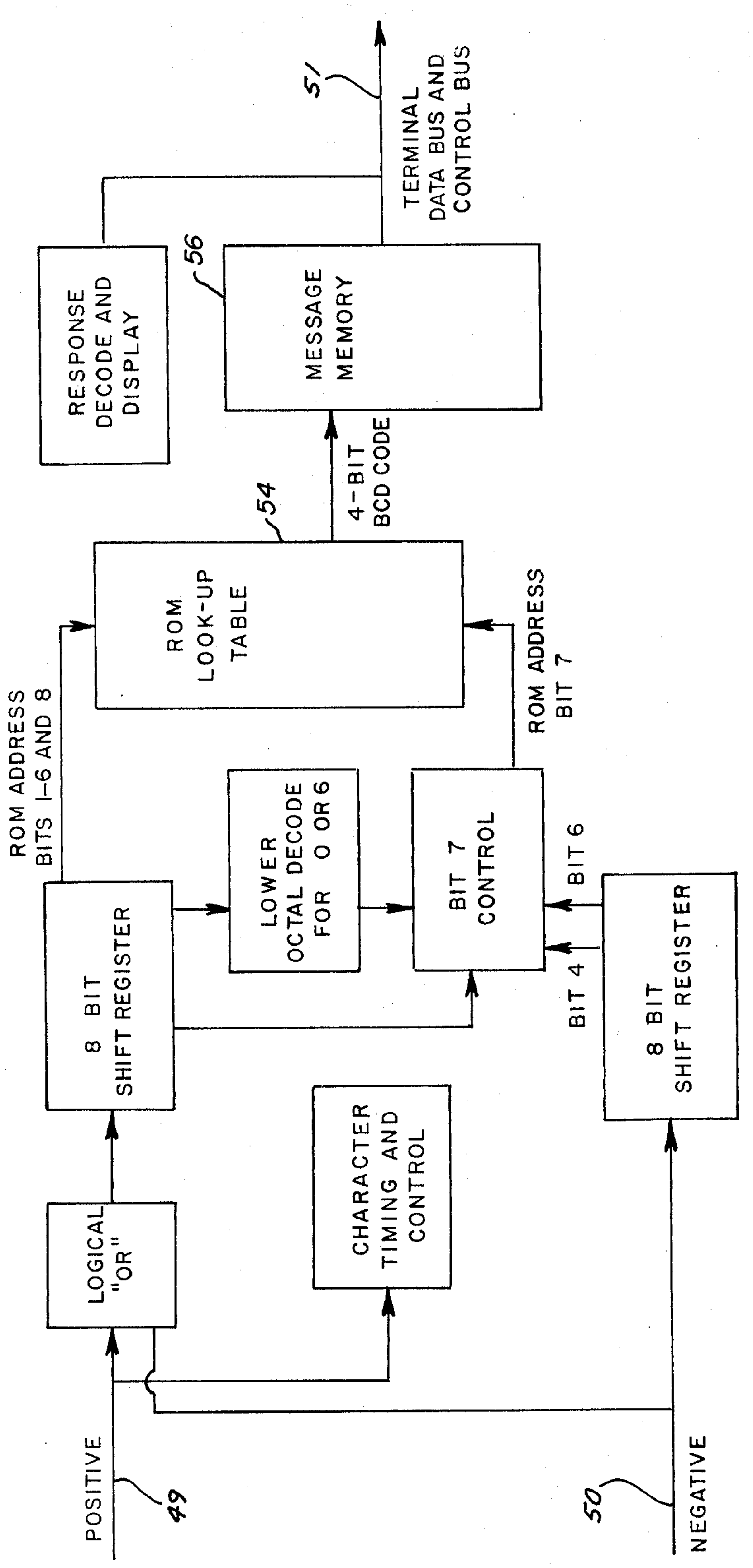
FIG. 6 is a block diagram of a form of read head signal redundancy decoder useful with the signal trace generator of FIG. 5.

The circuitry for converting the read head signal to the eight-bit binary coding can be of any usual or preferred construction, a block diagram of a typical circuit for accomplishing this purpose being shown at FIGS. 5 and 6.

As shown, a positive signal line 49 carries the positive binary code signals generated at the read head 35 while a negative signal line 50 carries the negative binary code signals generated at the read head. These signals are "anded" and the resulting composite binary code from bit positions 1 through 6 and 8 are introduced into a read-only-memory (ROM) look-up table 54 while the binary code for bit 7 is controlled and forced to be a binary 1 or 0 pursuant to the lower octal code and the presence or absence of a negative code binary 1 at certain bit locations in a manner explained subsequently.

Assuming all of the read head signals were properly picked up by this circuitry, the binary composite code will be as shown on line 47, or, reversing the order to read from left to right: 1 1 1 1 0 1 1 0. The octal equivalent of this number is 3 6 6. However, along read head signal trace 42, the three signals which are weak enough to be at least occasionally lost have been identified by weak signal circles 48. On the binary code lines, these same weak signal circles 48 appear. This is to indicate that, on a particular readout of the character 6, either a 1, or a 0 can appear at these points. Thus, including the octal designation 3 6 6, the character 6 can generate any one of the following octal designations:

| | |
|---|---|
| 3 6 6 | 3 4 6 |
| 2 6 6 | 2 4 6 |
| 3 2 6 | 2 2 6 |
| 3 0 6 | 2 0 6 |

Again reversing the order to read from the left to the right as is usual in such notations, the binary positive code 45, the binary negative code 46 and the binary composite code 47 can be indicated as follows:

| | | |
|---|---|---|
| 6 | + | 10 X00 100 |
| | − | 0X 0X0 010 |
| | anded | 1X XX0 110, |

where a 1 struck over with an X indicates bit locations which may have either a 1 or a 0 signal.

This same designation can be generated for each of the characters currently in use, and the octal designation of the eight-bit codes, taking into account the possible variations due to loss of weak signals can be determined. This information as to the first 10 of the characters commonly in use is set out in FIG. 4. Another four characters are currently in use, but adding them to this explanation will not be useful in explaining the invention.

From FIG. 4 it will be noted that identical binary composite codes, and hence identical octal numbers, can be generated by several different characters, thus presenting ambiguities which must be resolved if the reader of the present invention is to be useful. Thus octal codes 3 3 0 and 2 3 0 can represent both a character 2 and a character 7, octal codes 3 4 6 and 2 4 6 can represent either characters 6 or 9, and octal code 2 7 0 can represent either characters 1 or 7.

This conflict can be resolved by feeding the positive and negative bit information into a 128 by 128 matrix and this can generate an unambiguous designation for all characters even without reference to the weak signal traces. While such a system is within the contemplation of the invention, it is more complex and more expensive than the system which will now be explained.

Every octal code which can possibly be derived from reading a magnetic character is set up in the ROM look-up table 54 as an address of a particular character. These octal codes, the characters for which they are addresses, the ROM contents of the table for each character, and the binary designation for each character are set out below as Table No. 1.

TABLE NO. 1

| ADDRESS | ROM CONTENTS | CHARACTER REPRESENTED | BINARY |
|---|---|---|---|
| 2 0 4 | 1010 | 5 | 0101 |
| 2 0 6 | 1001 | 6 | 0110 |
| 2 1 0 | 1101 | 2 | 0010 |
| 2 1 2 | 1011 | 4 | 0100 |
| 2 1 4 | 1010 | 5 | 0101 |
| 2 2 4 | 1000 | 7 | 0111 |
| 2 2 6 | 1001 | 6 | 0110 |
| 2 3 0 | 1101 | 2 | 0010 |
| 2 3 4 | 1000 | 7 | 0111 |
| 2 4 2 | 0110 | 9 | 1001 |
| 2 4 6 | 1001 | 6 | 0110 |
| 2 5 0 | 1110 | 1 | 0001 |
| 2 5 2 | 1011 | 4 | 0100 |
| 2 6 4 | 1000 | 7 | 0111 |
| 2 6 6 | 1001 | 6 | 0110 |
| 2 7 0 | 1110 | 1 | 0001 |
| 2 7 4 | 1000 | 7 | 0111 |
| 3 0 3 | 0101 | 0 | 1010 |
| 3 0 4 | 1010 | 5 | 0101 |
| 3 1 4 | 1010 | 5 | 0101 |
| 3 2 0 | 1000 | 7 | 0111 |
| 3 2 4 | 1000 | 7 | 0111 |
| 3 3 0 | 1000 | 7 | 0111 |
| 3 3 4 | 1000 | 7 | 0111 |
| 3 4 0 | 1100 | 3 | 0011 |
| 3 4 2 | 0110 | 9 | 1001 |
| 3 4 4 | 1100 | 3 | 0011 |
| 3 4 6 | 0110 | 9 | 1001 |
| 3 4 7 | 0111 | 8 | 1000 |
| 3 6 0 | 1000 | 7 | 0111 |
| 3 6 4 | 1000 | 7 | 0111 |
| 3 7 0 | 1000 | 7 | 0111 |
| 3 7 4 | 1000 | 7 | 0111 |

Using the character 4 as an example, both the octal code address location 252 and the octal code address location 212 in ROM look-up table 54 represent the character 4. When either of these octal codes is derived from a reading of a magnetic character, a further code designating the character 4 is transmitted from table 54 into message memory 56. This is complete and satisfactory except where the reading of two different characters can result in the generation of the same octal designation. In accordance with the present invention, this conflict is resolved by referring to the binary coding of certain bits derived from the negative signal trace generated at the read head. Here each character is unique.

This unique characteristic is used to solve the identity conflict as to whether, for example, octal codes 346 and 246 represent the character 6 or the character 9. At bit designation position 6, in the character 9, a negative code binary 1 always appears on the negative signal line (see FIG. 4). At the same bit designation in character 6, there is never binary 1 on the negative signal line (see FIGS. 3 and 4). The lower octal is 6 in octal 346 and in octal 246. When this lower octal 6 is present and the aforementioned binary 1 does not exist, the octal which is in conflict must designate the character 6. If the lower octal is 6, and the aforementioned binary 1 is present at bit designation 6, then the octal in conflict must represent the character 9.

In Table 1, however, it is noted that a code representing the character 6 is contained in address 246 and a code representing the character 9 is contained in address 346. Proper transmission of the code representing the proper character can be obtained by using address bit 7, as the bits are identified at the top of FIG. 4, to control which address should be accessed. Since every conflict occurs only when the lower three bits are either an octal 6 or an octal 0, these two conditions are used to trigger the special use of the bit 7.

For example, if the lower bits are an octal 6 and negative code bit 6 is a binary 1, then bit 7 is forced to a 1 causing address 346 to be accessed when the magnetic character read out is the character 9. If, however, the lower bits are an octal 6, but the negative code bit 6 is not a binary 1, then bit 7 is forced to go to a binary 0, causing address 246 to be accessed. Thus the octal number for the character 9 has been "forced" to the address location 346, and the octal number for the character 6 has been "forced" to the octal address location 246. In this way, the code derived from ROM look-up table 54 will be properly representative of the character 6 or the character 9.

In order for address bit 7 to cause the conflict to be resolved, it is forced to 0 if:

Lower octal is 6 and negative code bit 6 is not 1; or lower octal is 0 and negative code bit 4 is a binary 1.

Address bit 7 is forced to binary 1, if:

Lower octal is 6 and negative code bit 6 is a binary 1; or lower octal is 0 and negative code bit 4 is not a binary 1.

As seen in Table 1, in the case of the conflict between character 1 and character 7, although 270 is a possible octal designation for both characters, it is the ROM address only for the code representing the character 1. By use of address bit 7 as set out above, the ROM address octal code will be forced to 270 because the lower octal is 0 and negative code but 4 is a binary 1. In the case of the read head encountering a magnetic character 7, the octal code address will be forced to 370 because the lower octal is 0 and negative code bit 4 is not a binary 1.

The same situation applies to all other conflicts.

To present an appropriate signal to the ROM look-up table 54, in FIG. 6, the input to FIG. 5 is the read head signal as plotted on trace 42 and as picked up by magnetic read head 35. The output from FIG. 5 goes out in the electronic representation of the binary positive code, as indicated on line 45 for character 6, for example, this code going out on positive signal line 49; the binary negative code designation representation going out on negative signal line 50 in FIG. 5.

Thus the input to the circuitry of FIG. 6 is from the same positive signal line 49 and negative signal line 50; while the output from FIG. 6 to any location for use of the identification of the character scanned goes out on reader output line 51 in the form of the unambiguous identification of the character read. For example, the binary output on line 51 resulting from the scanning of the character 6 as shown in FIG. 3 would be: 1 0 0 1. This output can be used in any usual or preferred manner forming no part of the present invention. For example, it can be used as input to a bank accounting system.

The embodiments of the invention in which an exclusive property or privilege is claimed are defined as follows:

1. A method of identifying particular magnetic characters from a predetermined set of characters having adjacent segments of greater and lesser totality of magnetic flux across the characters in a first direction including the steps of:

A. recording and locating within a memory a separate signal code representative of each of the predetermined characters and associating a separate predetermined address with each of said signal codes within this memory;

B. moving the magnetic characters relatively past a magnetic read head in said first direction;

C. obtaining from said read head a signal trace indicative of the signals generated as the adjacent segments move relatively past the head;

D. deriving a signal trace function;

E. using said function of said signal trace to address a location within said memory;

F. deriving the signal code located at said address and representative of a particular character; and G. transmitting said signal code to a location for use.

2. The method of claim 1 wherein the magnetic characters are encoded in magnetic ink on a non-magnetic sheet and each character includes a plurality of segments, each segment having uniform individual totality of magnetic ink in direction transverse to said first direction, each segment being in contiguous relation to at least one other similar segment of different uniform totality of such ink in said transverse direction; the additional step of magnetically saturating the characters in one direction; wherein the step deriving the signal trace function includes the acquisition of a positive directional signal trace function representative of increases in magnetic flux and a negative directional signal trace function representative of decreases in such flux and includes acquisition of signal trace functions representative of the magnitude of such changes; and wherein the step of using the signal trace function to address a location within the memory includes use of the directional aspects of signal trace functions.

3. The method of claim 2 wherein some of the flux changes between segments of particular characters are of such small magnitude that the signal trace functions of such characters can sometimes fail to recognize such change; wherein the directional signal trace functions are added to obtain a composite signal trace function; wherein the prerecorded addresses include addresses corresponding to each possible combination of composite signal trace functions of each character resulting from all possible combinations of recognizing and failing to recognize such small magnitude changes, at least some of such composite signal trace functions identifying more than one character; and wherein the step of deriving said signal code representative of a particular character includes utilizing one of said directional signal trace functions to differentiate between characters having identical composite signal trace functions.

* * * * *

UNITED STATES PATENT OFFICE

CERTIFICATE OF CORRECTION

Patent No. 3,818,446 Dated June 18, 1974

Inventor(s) David A. Benson

It is certified that error appears in the above-identified patent and that said Letters Patent are hereby corrected as shown below:

Column 4, line 56, after the word "accordance", insert -- with --. Column 5, lines 40, 41 and 42 should read as follows:

| | | | | |
|---|---|---|---|---|
| 6 | + | 10 | X00 | 100 |
| | - | 0X | 0X0 | 010 |
| | anded | 1X | XX0 | 110 |

Column 7, line 43, "but" should read -- bit --.

Signed and sealed this 3rd day of December 1974.

(SEAL)
Attest:

McCOY M. GIBSON JR.
Attesting Officer

C. MARSHALL DANN
Commissioner of Patents